United States Patent
Gottwald et al.

(10) Patent No.: US 7,672,589 B2
(45) Date of Patent: Mar. 2, 2010

(54) METHOD AND POLARIZATION-MULTIPLEX SYSTEM FOR REDUCING THE SIGNAL DEGRADATION OF AN OPTICAL POLARIZATION-MULTIPLEX SIGNAL

(75) Inventors: Erich Gottwald, Holzkirchen (DE); Nancy Hecker, München (DE); Werner Paetsch, München (DE); Wolfgang Schairer, München (DE)

(73) Assignee: Nokia Siemens Network GmbH & Co., KG, Munich (DE)

( * ) Notice: Subject to any disclaimer, the term of this patent is extended or adjusted under 35 U.S.C. 154(b) by 1078 days.

(21) Appl. No.: 10/513,975

(22) PCT Filed: May 6, 2003

(86) PCT No.: PCT/DE03/01446

§ 371 (c)(1),
(2), (4) Date: Nov. 9, 2004

(87) PCT Pub. No.: WO03/096584

PCT Pub. Date: Nov. 20, 2003

(65) Prior Publication Data

US 2005/0213975 A1  Sep. 29, 2005

(30) Foreign Application Priority Data

May 10, 2002 (DE) .................. 102 20 929
Sep. 16, 2002 (DE) .................. 102 42 915

(51) Int. Cl.
*H04J 14/06* (2006.01)
*H04B 10/00* (2006.01)

(52) U.S. Cl. ......................... 398/65; 398/152

(58) Field of Classification Search ................... 398/65, 398/152
See application file for complete search history.

(56) References Cited

U.S. PATENT DOCUMENTS

| 5,659,412 A | 8/1997 | Hakki |
|---|---|---|
| 5,822,100 A | 10/1998 | Fee et al. |
| 6,211,996 B1 * | 4/2001 | Fuse .......................... 359/278 |
| 6,342,961 B1 | 1/2002 | Bergano et al. |
| 6,714,742 B1 * | 3/2004 | Hayee et al. .................. 398/65 |
| 2002/0003641 A1 | 1/2002 | Hall et al. |

FOREIGN PATENT DOCUMENTS

| EP | 0 475 640 A2 | 3/1992 |
|---|---|---|
| EP | 1 202 485 A1 | 5/2002 |
| EP | 1 298 818 A2 | 4/2003 |
| JP | 05136761 | 6/1993 |
| JP | 08201861 | 8/1996 |
| JP | 200286795 | 10/2000 |
| JP | 2001284705 | 10/2001 |
| JP | 2002026822 | 1/2002 |
| JP | 2002077091 | 3/2002 |
| RU | 2138913 | 9/1999 |
| WO | WO0120452 | 3/2001 |

\* cited by examiner

*Primary Examiner*—Quan-Zhen Wang
(74) *Attorney, Agent, or Firm*—Dickinson Wright PLLC

(57) ABSTRACT

Method for reducing signal degradation in an optical polarisation-multiplex system. The modulated optical signals to be transmitted are synchronised or generated such that the phase difference for NRZ-modulated signals is at least approximately 0° and the phase difference for RZ-modulated signals is at least approximately 180°. They can also be achieved by means of different synchronising devices.

23 Claims, 4 Drawing Sheets

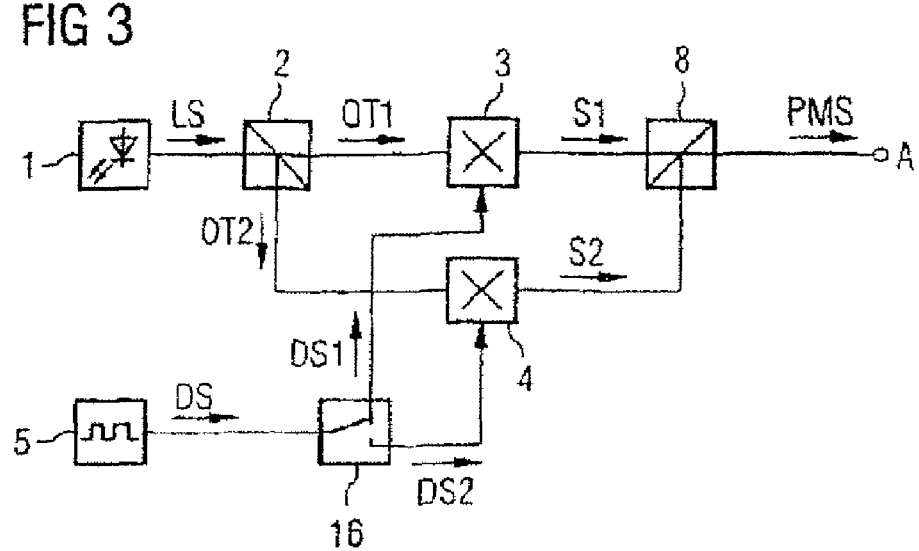
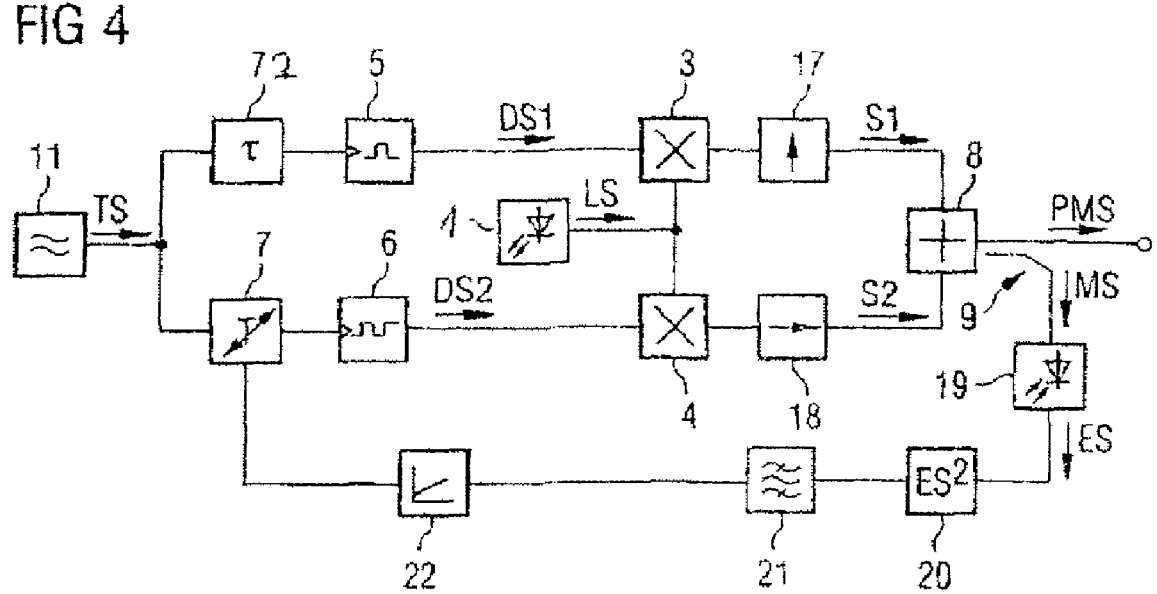

FIG 5
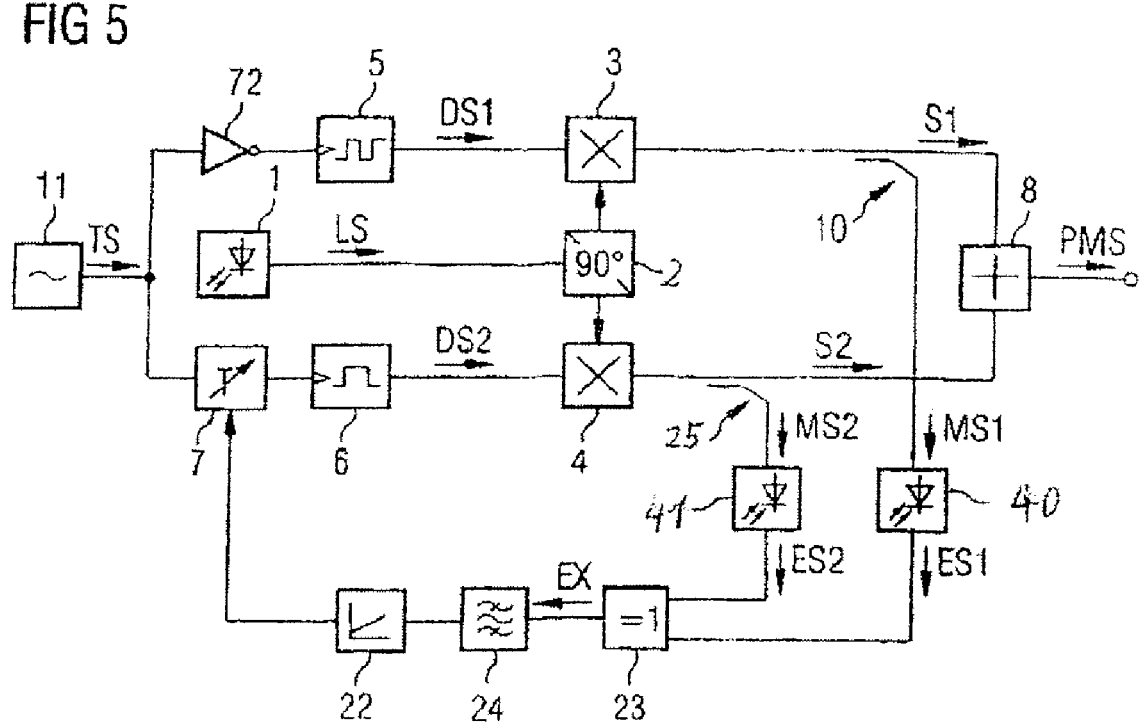
FIG 6
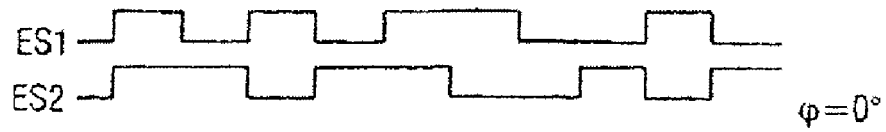
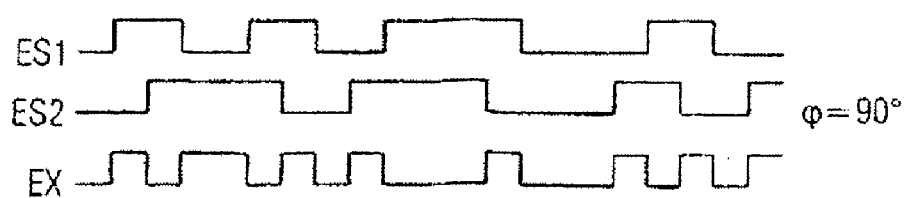

METHOD AND POLARIZATION-MULTIPLEX SYSTEM FOR REDUCING THE SIGNAL DEGRADATION OF AN OPTICAL POLARIZATION-MULTIPLEX SIGNAL

CROSS REFERENCE TO RELATED APPLICATIONS

This application is the US National Stage of International Application No. PCT/DE03/01446, filed May 6, 2003 and claims the benefit thereof. The International Application claims the benefits of German application No. 10220929.4 DE filed May 10, 2002 and German application No. 10242915.4 DE filed Sep. 16, 2002, all of the applications are incorporated by reference herein in their entirety.

FIELD OF INVENTION

The invention relates to a method and a system for reducing the signal degradation according to the Claims.

BACKGROUND OF INVENTION

In order to increase the transmission capacity in optical transmission systems the polarisation-multiplex method is used, whereby two signals are polarised orthogonally to one another by an advantageous means and transmitted on the same wavelength.

If polarisation mode dispersion (PMD) occurs, this leads to coherent crosstalk between the signals. Even at low PMD values this crosstalk makes error-free transmission of polarisation-multiplex signals impossible, whereas in transmission systems without polarisation-multiplex such PMD values are still tolerable. Interference makes itself felt both in amplitude modulation (including multistage) and in angle modulation.

European patent application EP 1 202 485 AI discloses a method for transmitting polarisation-multiplex signals in which a signal is divided into two part-signals which are then reassembled into a time-multiplex signal with mutually perpendicular polarisation levels. The time-multiplex method avoids mutual signal interference and halves the data transfer rate in each signal. However the desired doubling of the transmission capacity is not achieved.

SUMMARY OF INVENTION

The object of the invention is to reduce the signal degradation in polarisation-multiplex signals without restricting the transmission capacity.

This object is achieved by means of a method and a system with features which will emerge from the claims.

Advantageous embodiments are specified in the individual claims.

The core of the invention consists in a temporal arrangement of the interference caused by a signal to ensure that it falls in the non-critical area of the other signal, where it has no effect on the evaluation of the logical state. Since this interference originates from the bit boundaries (in the case of multiphase modulation this refers to the modulation segment boundaries) and in the case of amplitude modulation is caused by the signal edges, the two signals should be synchronised on transmission in such a way that their bit boundaries or signal edges do not fall in the critical evaluation areas, that is, not in and around bit centres. In the case of NRZ (non-return-to-zero duty cycle>50%) signals, therefore, the bit boundaries have to coincide. In short-pulse RZ signals a 180 degree is applied. phase shift. The same applies to angle-modulated signals.

Two signals from different data sources must be synchronised or their clock pulses must be adapted as necessary.

The method to which the invention relates more than doubles the tolerance to PMD, enabling the maximum possible number of regenerator-free transmission links to be increased by a factor of 4.

This also makes it possible to have a transmission method which combines polarisation-multiplex with multistage phase modulation. If four-phase modulation is used a fourfold data transfer rate is possible. Similar advantages are obtained in the case of double-binary encoding.

BRIEF DESCRIPTION OF THE DRAWINGS

Typical embodiments of the invention will be explained in greater detail with the aid of figures.

These show the following:

FIG. 3: a transmission arrangement for converting a data signal into two transmission signals polarised in parallel, FIG. 4: a transmission arrangement with a controller making use of the data multiplex signal, FIG. 5: a transmission arrangement with a comparator for generating the control signal, FIG. 6: an associated time diagram.

DETAILED DESCRIPTION OF INVENTION

Figure 1:
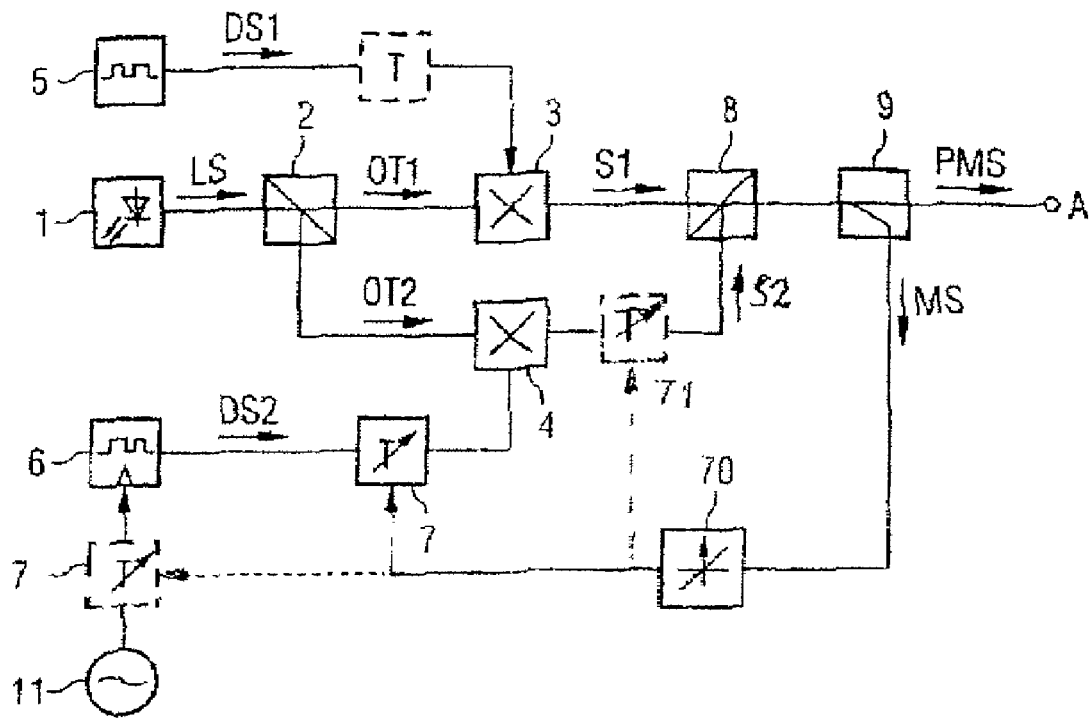
FIG. 1: a transmitter arrangement with an electrical phase-shifter for the purpose of synchronisation.

FIG. 1 shows a transmission arrangement for transmitting a PMD signal. The typical embodiment assumes that the light has been polarised in linear fashion and amplitude modulation has been assumed for ease of understanding. However, other (orthogonal) polarisation types and other modulation types are also possible.

A coherent light source (laser) 1 generates a laser signal LS that is divided in an optical polarisation beam splitter 2 into two orthogonal components, carrier signals OT1 and OT2. Each of these is fed to a modulator of its own, such as a Mach-Zehnder modulator 3 and 4. The modulator 3 is controlled by a first electrical data source 5, which generates a first data signal DS1. A second electrical data source 6 generates a second data signal DS2, which is fed via an electrical delay element (phase shifter) 7 to the second modulator 4. The modulated signals S1 and S2 are fed together via a polarisation-beam combiner 8 (meaning any combiner that is suitable for combining signals, such as a 3 dB coupler) and the polarisation-multiplex signal PMS so obtained is delivered at output A. It is assumed that the two data sources are synchronised with one another so that only one synchronisation device 7, 70 is needed to provide the optimum phase position between the first data signal DS1 and the second data signal DS2. This optimum phase position is produced by a phase shifter which takes the form of an adjustable, electrical delay element 7. In principle the adjustable phase shifter can be arranged at any point in the signal path of signal S1 or S2 (including the clock pulse feed).

Advantageously the delay element 7 is regulated by a control system 70 which is fed with a measurement signal MS tapped from the polarisation-multiplex signal PMS. Any criteria can be used for control purposes, including the error rate or a harmonic component of the signal. In order to obtain a symmetrical control range, a further (electrical) delay element 72 can be inserted between for example the first data source 5 and the first modulator 3. In principle the electrical delay element 7 could be replaced by a controllable optical delay element 71. The optical delay element 71 is then inserted after the second modulator 4, for example.

A solution of equal value consists in inserting the delay element in a clock signal feed line, if a data source is triggered by a clock pulse generator 11.

In the case of NRZ signals which shall include all signals with a duty cycle >50% the electrical delay element 7 is set so that modulation segment boundaries, or in the case of amplitude modulation the edges of the signals S1 and S2 being transmitted, occur at the same instants (in the case of angle modulation, the instants in which the frequency or phase are rekeyed, e.g. bit boundaries), so that the generated interference is as far removed as possible from the evaluation area, which is usually the evaluation or sampling point in the bit centre.

Figure 2:
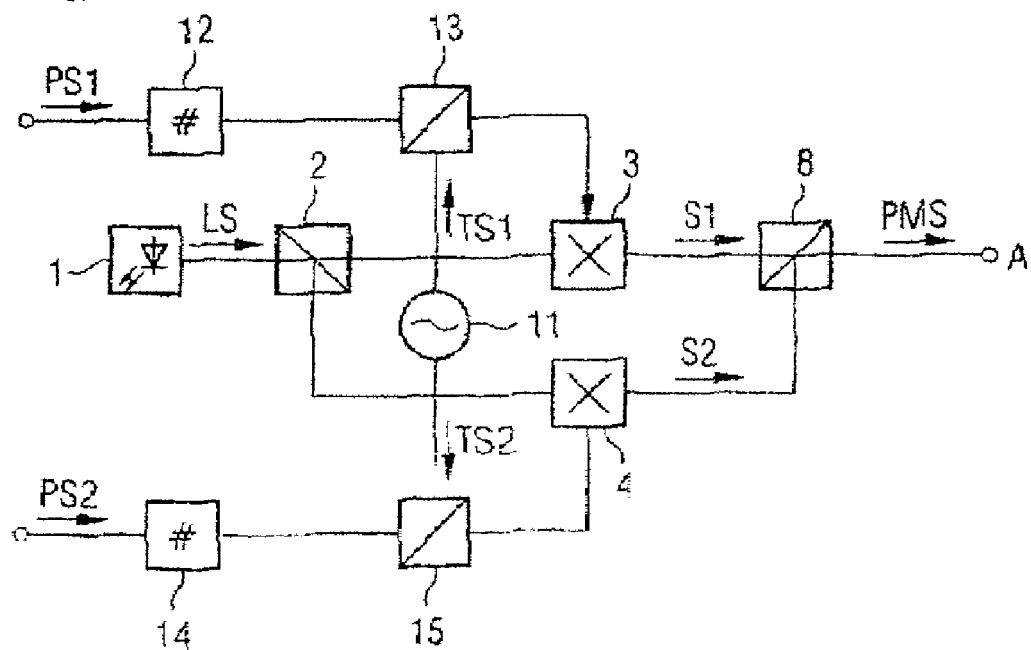
FIG. 2: a transmission arrangement for generating synchronous polarised signals.

FIG. 2 shows an arrangement for transmitting plesiochronous signals. Two plesiochronous data signals PS1 and PS2 are first written to memory 12 or 14 and then retrieved from these with the aid of a clock signal TS1 or TS2, both being generated by a single clock pulse generator 11. Adaptation between the data transfer rate of the plesiochronous signals and the clock signals TS1 and TS2 is effected by pulse adapters 13 or 15, which use padding routines to compensate for differences in the data transfer rates. In the case of NRZ signals the clock signals TS1 and TS2 have the same phase position.

FIG. 3 shows an arrangement in which a data signal DS is divided by a demultiplexer into two data signals DS1 and DS2 at half the data transfer rate. These data signals are used to modulate the orthogonal components OT1, OT2 of the laser signal LS and the modulated signals S1, S2 are assembled in the polarisation coupler 9 into the polarisation-multiplex signal PMS. In the case of NRZ signals, buffer stores are connected before the modulators and modulation proceeds in synchronous mode.

An important aspect of the method to which the invention relates is a phase position which is as far as possible optimum between the orthogonal polarised transmission signals with the same data transfer rate, in order to minimise mutual interference.

FIG. 4 describes an arrangement involving a control device. Two data signal sources 5 and 6 receive their clock pulses from a common clock generator 11. The clock signal TS is fed via a fixed delay element 71 and an adjustable delay element 7 to each of the data signal sources. The data signal sources deliver a data signal each DS1 and DS2, which the modulators 3 and 4 use to modulate the amplitude of a carrier signal generated by the laser 1. This embodiment envisages two polarisation controllers 17 and 18 to rotate the modulated signals in two mutually orthogonal polarisation planes. The orthogonal signals are combined in an adder 8 and are then output as a polarisation-multiplex signal PMS. A measurement signal MS is tapped from this signal with the aid of a measuring coupler 9 and converted in a photodiode 19 into an electrical signal ES. This is squared in a multiplier 20 and then fed as a squared measurement signal ES2 to a filter 21, advantageously a bandpass filter. If the bit edges of the signals S1 and S2 are synchronous, the power is in a frequency range corresponding to the data transfer rate of the data signals, for example in the 10 GHz frequency range at a data transfer rate of 10 Gbit/s minimum. A controller 22 connected to the output from the filter varies the adjustable delay element 7 until this minimum is reached. The adjustable delay element 7 can be connected in at any point in the lower second signal path 7, 6, 4, 18, 8 of the arrangement. It goes without saying that the arrangement shown in FIG. 1 can also be fitted with this controller.

Further squaring of the electrical measurement signal ES (the first takes place with the aid of the photodiode 19) provides an improved control criterion. In principle it can be said that either the fundamental frequency is controlled to achieve a maximum or the interfering frequency components are controlled to achieve a minimum, which in general produces a slightly flatter trend line.

FIG. 5 shows a further variant of the control system. Again two orthogonally polarised, amplitude-modulated signals S1 and S2 are generated. FIG. 5 differs from FIG. 4 only in that the optical carrier generated by the laser 1 is fed via a polarisation splitter 9, which means that the polarisation controllers can be omitted. From each of the two modulated, polarised signals S1 and S2 a measurement signal MS1 and MS2 is tapped with the aid of measuring couplers 10 and 25 and fed to opto-electrical converters 12 and 13 (demodulators). The electrical signals are logically compared with one another in an exclusive OR gate or an exclusive NOR gate. If the signals S1 and S2 are synchronous and without any phase difference, .phi.=0, as shown in the time diagram FIG. 6, the output signal EX from the exclusive OR gate has no more than half the frequency of the data transfer rate. However if a phase difference exists, e.g. .phi.=90 degree. between the signals S1 and S2, as also shown in the time diagram FIG. 6 in one case, the output frequency is doubled. Depending on the version of the filter 24 the controller 22 can control to achieve a maximum of its input signal of half the data transfer rate or to achieve a minimum of its input signal with a higher data transfer rate by adjusting the delay element 7.

Figure 7:
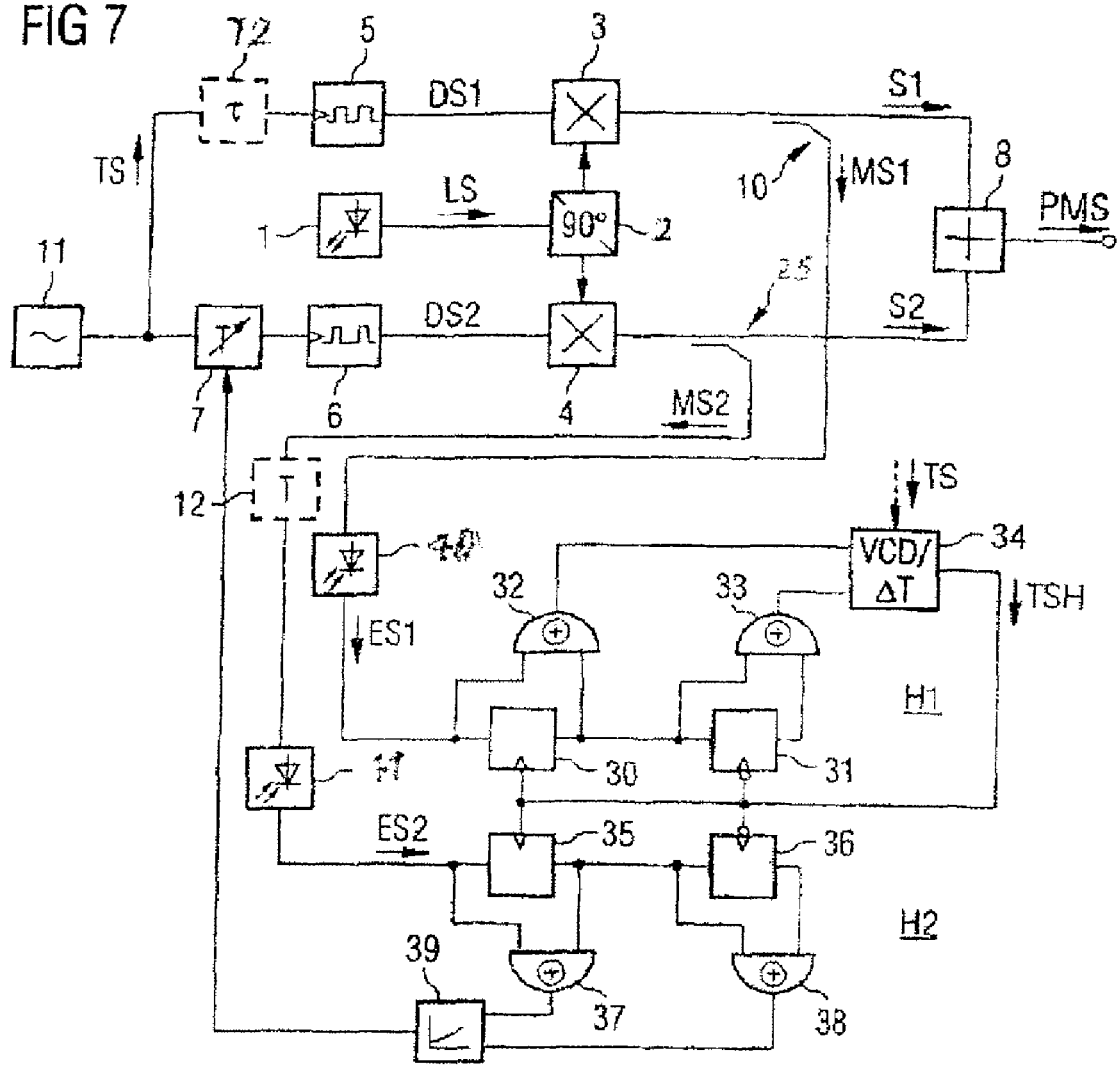
FIG. 7: a transmission arrangement with two phase detectors.

FIG. 7 shows a further arrangement for synchronisation which contains two phase detectors 30, 31, 32, 33 and 35, 36, 37, 38. These are configured as Hogge phase detectors, each with two flip-flops 32, 33 or 35, 36 and two exclusive OR gates 32, 33 or 37, 38. The first phase detector, which is allocated to the first (upper) signal path 5, 3, 8 and receives its input signal via a first measuring coupler 10 and the photodiode 12, ensures that a defined phase relationship exists between the input signal and the clock signal TSH generated by a controllable oscillator (VCO) 34. For this the input signal to the phase detector is sampled in the bit centre of the clock signal TSH and buffered in the flip-flop 30. Since a clock signal TS with the same frequency is already being generated by the clock generator 11, an adjustable delay element can be used instead of the oscillator, making the circuit considerably simpler to produce.

Figure 8:
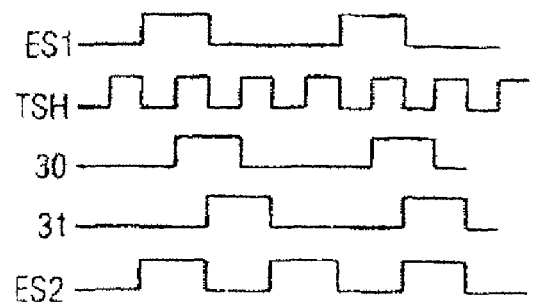
FIG. 8: an associated time diagram.

In a symmetrical configuration the second phase detector 35, 36, 37, 38, which receives its input signal via the second measuring coupler 25 and the photodiode 13, uses the controller 39 to set the adjustable delay element 7 in such a way that the input signal to the second phase detector is also sampled in the centre, i.e. both signals S1 and S2 are phase-synchronous. FIG. 8 shows this case in a time diagram.

If angle modulation is used instead of amplitude modulation, the same circuits can be used if the signals are first converted into amplitude modulated signals.

The invention claimed is:

1. A method for reducing signal degradation of a polarization-multiplex signal, comprising:
   modulating a first optical signal with a first data signal and a second optical signal with a second data signal at a same data transfer rate generating a first modulated optical signal and a second modulated optical signal having different polarizations;

combining the first modulated optical signal and the second modulated optical signal to the polarization-multiplex signal in a non-return-zero encoding;

converting a measurement signal of the polarization-multiplex signal into an electrical signal, deriving a control signal from said electrical signal by an filter and synchronizing the first modulated optical signal and the second modulated optical signal that a phase difference between said modulated optical signals becomes approximately zero; and transmilling the polarization-multiplex signal.

2. The method as claimed in claim 1, wherein the first data signal and second data signal are buffered and modulated onto the first and second optical carrier signals via a first clock signal and second clock signal, the first and second clock signal derived from a same clock pulse generator.

3. The method as claimed in claim 1, wherein the first and second data signals are generated by demultiplexing a data signal.

4. The method as claimed in claim 1, wherein the modulation of the first and second optical carrier signals are aided by a two-stage or multistage phase modulation.

5. The polarization-multiplex system according to claim 4, wherein the adjustable delay element is an optical delay element inserted between one of said modulators and the combiner.

6. A method for reducing signal degradation of a polarization-multiplex signal, comprising:

modulating a first optical signal with a first data signal and a second optical signal with a second data signal at a same data transfer rate generating a first modulated optical signal and a second modulated optical signal having different polarizations;

supervising a phase difference between the first modulated optical signal and the second modulated optical signal, deriving a control signal from said optical signals according to their phase difference and synchronizing the first modulated optical signal and the second modulated optical signal that the phase difference between said modulated optical signals becomes approximately zero;

combining the first modulated optical signal and the second modulated optical signal to the polarization-multiplex signal in a non-return-zero encoding; and transmitting the polarization-multiplex signal.

7. A polarization-multiplex system adapted to reduce a signal degradation of an optical polarization-multiplex signal, comprising:

a first data signal source and a second data signal source outputting a first data signal and a second data signal with a same data transfer rate;

a first signal path including the first data signal source and a first modulator, and a second signal path including the second data signal source and a second modulator;

the first modulator modulating a first optical carrier by the first data signal generating a first modulated optical signal, and the second modulator modulating a second optical carrier, derived from a same laser source, by the second data signal generating a second modulated optical signal, both in a non-return-to-zero format;

an adjustable delay element inserted in one of said signal paths for synchronizing the first modulated optical signal and the second modulated optical signal, a combiner combining the first modulated optical signal and the second modulated optical signal to the polarization multiplex signal; and means for supervising the polarisation multiplex signal and for deriving a control signal from said polarisation multiplex signal and adjusting the adjustable delay element that the phase difference between the first modulated signal and the second modulated signal becomes approximately zero.

8. The polarization-multiplex system according to claim 4, wherein the adjustable delay element is an electrical delay element inserted between one of said data sources and the associated modulator.

9. The polarization-multiplex system according to claim 7, wherein the adjustable phase shifter or clock pulse adapter is operatively connected between a clock signal generator and one of said data sources.

10. The polarization-multiplex system according to claim 9, wherein the adjustable phase shifter include a electrical delay element inserted between the clock pulse generator and one of said data sources.

11. The polarization-multiplex system according to claim 7, wherein the synchronization device further comprises:

a splitter tapping a portion of the polarization-multiplex signal as a measurement signal;

an opto-electrical converter converting the measurement signal into an electrical measurement signal;

a multiplier converting the electrical measurement signal into a squared measurement signal; and a control device to which the square measurement is fed by a filter as a control signal for optimizing the amplitude of a filter output signal by adjusting the second modulated optical signal in time relative the first modulated optical signal.

12. The polarization-multiplex system according to claim 7, wherein the first and the second modulator are phase modulators.

13. A polarization-multiplex system adapted to reduce a signal degradation of an optical polarization-multiplex system, comprising:

a first data signal source and a second data signal source outputting a first data signal and second data signal with a same data transfer rate;

an adjustable phase shifter or clock signal adapter receiving a clock signal from a clock pulse generator and triggering one of said data signal sources with an adjustable clock signal, a first signal path including the first data signal source and a first modulator, and a second signal path including the second data signal source and a second modulator;

the first modulator modulating a first optical carrier by the first data signal generating a first modulated optical signal, and the second modulator modulating a second optical carrier, derived from the same laser source, by the second data signal generating a second modulated optical signal, both in a non-return-to-zero format;

a combiner combining a first modulated optical signal and a second modulated optical signal to a polarization multiplex signal; and means for supervising the polarisation-multiplex signal and for deriving a control signal from said polarisation-multiplex signal and adjusting the phase of said phase shifter or clock adapter that the phase difference between the first modulated optical signal and the second modulated optical signal becomes approximately zero.

14. The polarization-multiplex system according to claim 7, wherein
the first data signal source includes a first storage, receiving a first plesiochronous data signal, connected in series with a first pulse adapter, and the second data signal source includes a second storage, receiving a second plesiochronous data signal, connected in series with a second pulse adapter compensating differences in data transfer rates.

15. The polarization-multiplex system according to claim 14, wherein the synchronisation device further comprises:
the filter selected from a group consisting of high-pass characteristics such that a lower cut-off frequency is above half the data transfer rate or consisting of band-pass characteristics such that a centre frequency corresponds to the data transfer rate, to which the squared measurement signal is fed, in which case the control device minimizes the amplitude of a filter output signal by adjusting the second modulated optical signal in time relative to the first modulated optical signal.

16. The polarization-multiplex system according to claim 14, wherein the synchronisation device further comprises:
the filter selected from the group consisting of low-pass characteristics such that a lower cut-off frequency is above half the data transfer rate and band-pass characteristics such that a centre frequency corresponds to the half data transfer rate, to which the squared measurement signal is fed, in which case the control device optimizes the amplitude of a filter output signal by adjusting the second modulated optical signal in time relative to the first modulated optical signal.

17. A polarization-multiplex system adapted to reduce a signal degradation of an optical polarization-multiplex signal, comprising:
a first data signal source and a second data signal source outputting a first and second data signal with a same data transfer rate;
a first signal path including the first data signal source and a first modulator, and a second signal path including the second data signal source and a second modulator;
the first modulator modulating a first optical carrier by the first data signal generating a first modulated optical signal, and the second modulator modulating a second optical carrier by the second data signal generating a second modulated optical signal, both in a non-return-to-zero format;
an adjustable electrical delay element inserted in the first or second signal path for synchronizing the first modulated and the second modulated signal,
a combiner combining the first modulated optical signal the second data signal to the polarization multiplex signal;
means for converting measurement signals tapped from the first modulated optical signal the second data signal into electrical signals, and
a phase detector supervising the electrical signals, deriving a control signal from said electrical signals and adjusting the adjustable delay element that the phase difference between the first modulated optical signal and the second modulated optical signal becomes approximately zero.

18. The polarization-multiplex system according to claim 17, wherein the adjustable delay element is an adjustable electrical delay element inserted between one of said data sources and the associated modulator.

19. The polarization-multiplex system according to claim 18, wherein the adjustable delay element is an adjustable optical delay element inserted between one of said modulators and the combiner.

20. The polarization-multiplex system according to claim 17, wherein the synchronization device further comprises:
a first measuring coupler for tapping a first measurement signal from the first modulated optical signal, and a second measuring coupler for tapping a second measurement signal from the second modulated optical signal;
a first opto-electrical converter for converting the first measurement signal into a first electrical measurement signal, and a second opto-electrical converter for converting the second measurement signal into a second electrical measurement signal;
an exclusive OR gate working as the phase detector to which the first and second electrical measurement signals are fed; and
a controller to which an output signal from the exclusive OR gate is fed via a filter and for controlling the adjustable delay element in the signal path or the adjustable phase shifter in such a way that the phase difference between the first modulated optical signal and the second modulated optical signal becomes approximately zero that the modulated optical signals have a same phase position.

21. The polarization-multiplex system according to claim 17,
wherein the synchronization device further comprises:
a first phase detector in the first signal path to which the first measurement signal is fed via a first opto-electrical converter;
a clock pulse regenerator generating a comparison clock pulse controlled by the first phase detector;
a second phase detector in the second signal path to which the comparison clock pulse and the second measurement signal are fed via a second opto-electrical converter outputting a control signal; and
a controller, controlled by the second phase detector and controlling the adjustable electrical delay element in the signal path or the adjustable phase shifter in such a way that the modulated optical signals have a same phase position.

22. A polarization-multiplex system adapted to reduce a signal degradation of an optical polarization-multiplex signal, comprising:
a first data signal source and a second data signal source outputting a first and second data signal with a same data transfer rate;
an adjustable phase shifter or clock signal adapter receiving a clock signal from a clock pulse generator and triggering one of said data signal sources with an adjustable clock signal,
a first signal path including the first data signal source and a first modulator, and a second signal path including the second data signal source and a second modulator;
the first modulator modulating a first optical carrier by the first data signal generating a first modulated optical signal, and the second modulator modulating a second optical carrier by the second data signal geerating a second modulated optical signal, both in a non-return-to-zero format;

a combiner combining the first modulated optical signal and the second modulated optical signal to the polarization multiplex signal; and means for synchronisation including a phase detector supervising the first modulated optical signal and the second modulated optical signal, deriving a control signal from said modulated optical signals and adjusting the adjustable phase shifter or clock signal adapter that the phase difference between the first modulated optical signal and the second modulated optical signal becomes approximately zero.

23. The polarization-multiplex system according to claim 22, wherein the adjustable phase shifter or clock pulse adapter is operatively connected between the clock signal generator and one of said data sources.

* * * * *